United States Patent Office 3,223,810
Patented Dec. 14, 1965

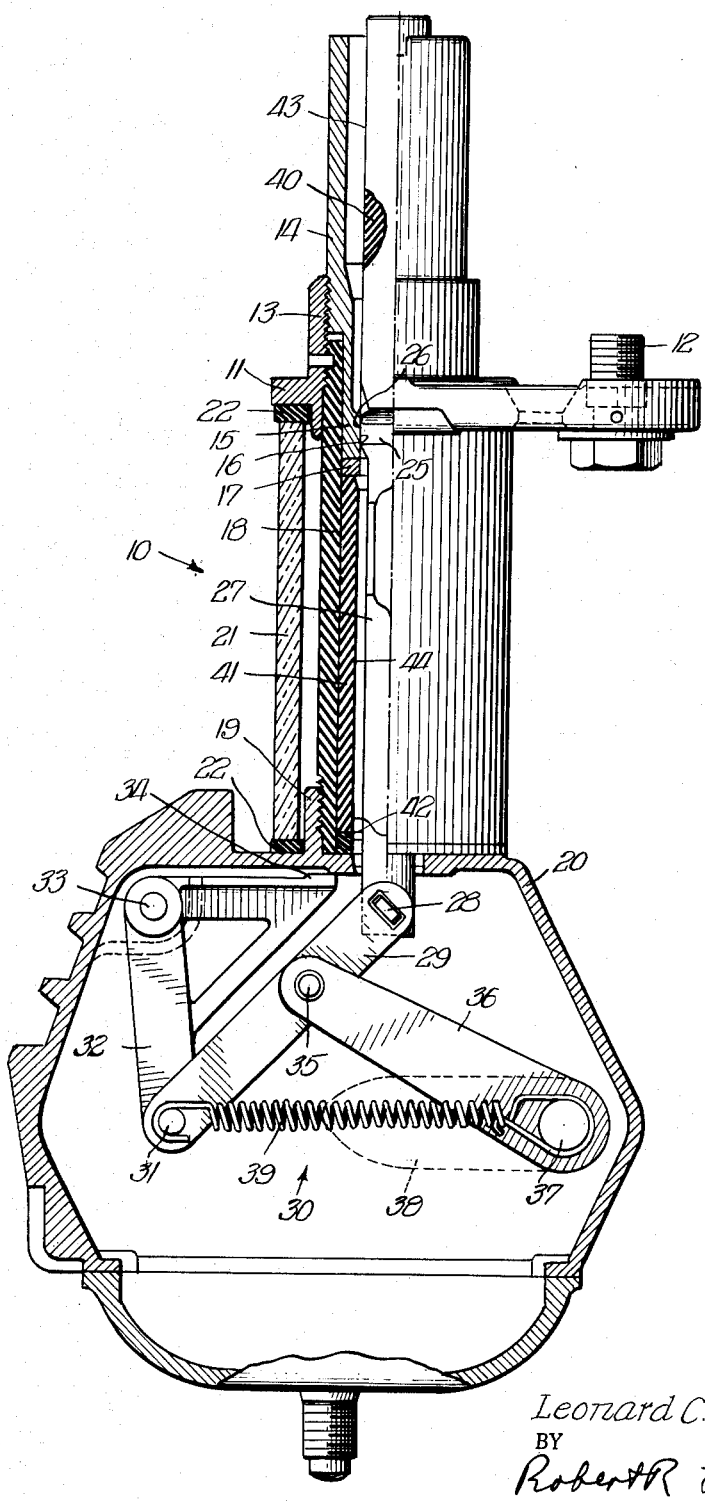

3,223,810
CIRCUIT INTERRUPTER EMPLOYING POLYPROPYLENE FOR CONFINING AND EXTINGUISHING THE ARC
Leonard C. Jelinek, North Riverside, Ill., assignor to S & C Electric Company, Chicago, Ill., a corporation of Delaware
Filed May 13, 1963, Ser. No. 279,882
3 Claims. (Cl. 200—149)

This invention relates, generally, to circuit makers and breakers and it has particular relation to such devices provided with arc extinguishing means.

It is customary to employ a load interrupter unit in conjunction with a disconnecting switch blade for the purpose of interrupting the flow of load current on the opening of the switch blade. A typical load interrupter unit is constructed as shown in U.S. Patent No. 2,591,950, issued April 8, 1952, to S. I. Lindell. The application of such a load interrupter unit is shown in U.S. Patent No. 2,954,448, issued September 27, 1960, to C. H. Baker. The load interrupter unit of the Lindell patent employs an annular stationary contact with which a plug type movable contact cooperates to open and close the circuit therethrough. Movable with the movable contact is a trailer that is formed of methylmethacrylate resin. The trailer is cylindrical in shape and is slightly less in diameter than the diameter of the opening through the stationary contact in order to permit the trailer to be moved therethrough without mechanical interference. The movable contact and trailer are arranged to move into a bore that is formed in a stack of fiber washers at one end of which the stationary contact is mounted. The arc drawn between the stationary and movable contacts is extended over the surface of the bore in the stack of fiber washers and is confined in close proximity to the surface of the bore by the outer surface of the trailer.

As long as the circuit interrupter unit of the Lindell patent can be maintained in a dry atmosphere or moisture can be prevented from coming in contact with the stack of fiber washers and if it is operated at frequent intervals, for example once a week or month, the device is entirely satisfactory and can be operated repeatedly for interrupting current within the intended range of current values.

In some applications of the device of the Lindell patent the interrupting unit is subject to relatively high humidity. In other applications that device may be subjected to conditions of prolonged humidity and then subjected to short periods of extreme dampness. Under these conditions the washers making up the stack of fiber washers are subjected to relatively excessive dimensional changes. They tend to swell or expand under conditions of high humidity and to shrink under conditions of extremely low humidity. Despite careful clamping and cementing of the fiber washers in the stack in a dimensionally stable tube, loosening of them and radial swelling thereof and shifting under added compressive force occur. Instead of the bore through a stack of washers being cylindrical and smooth, a roughened surface exists with variable cross-sectional areas throughout its length. As a result, mechanical interference is sometimes encountered when the rod like movable contact is moved through the bore. Likewise some interference results between the inner surface of the stack of fiber washers and the external surface of the trailer as it is moved along with the movable contact. Because of such mechanical interference, the movement of the movable contact and trailer may be relatively sluggish under these extreme conditions with the result that the circuit is not opened with the desired rapidity. These conditions are accentuated when the unit is not operated for long periods of time. When it is operated occasionally, the movement of movable contact burnishes or smooths the bore surface in the stack of washers and tends to counteract some of the dimensional changes here outlined.

Accordingly, among the objects of this invention are: To provide a combination of arc extinguishing materials in a load interrupter unit of the kind and character shown in the Lindell patent that will effectively assist in extinguishing alternating current arcs and which will be substantially unaffected by change in atmospheric conditions; to substitute for the stack of fiber washers above referred to a sleeve formed of a material having arc extinguishing characteristics at least equivalent to those of a stack of fiber washers and unaffected with respect to dimensional change as the result of subjection to high humidity or extremely damp conditions; to employ for this purpose polypropylene; and to form a trailer of this material and use it in combination with the sleeve of the same material.

In the drawing the single figure shows certain details of construction of a circuit interrupter or load interrupter unit embodying the present invention and arranged for use in connection with a disconnecting switch such as described in detail in the Baker patent above referred to.

Referring now particularly to the drawing, it will be observed that the reference character 10 designates, generally, a circuit interrupter of the kind shown in the Lindell patent and arranged for use in the switch construction shown in the Baker patent. Since the switch construction can be positioned in different planes, the circuit interrupter 10, for illustrative purposes, is shown with its longitudinal axis extending vertically. However, as shown in the Baker patent, it can be positioned horizontally, if desired.

The circuit interrupter 10 includes a metallic contact plate 11 that is arranged to be secured by a mounting bolt 12 to one of the terminals of the disconnecting switch. The metallic contact plate 11 has an annular extension 13 into which a metallic plug sleeve 14 is threaded. The inner or lower end of the metallic plug sleeve 14 forms a stationary contact 15 which has an internal annular contact surface 16 that is circular in shape. Below the annular contact surface 16 is an arcing ring 17 that is formed of arc resisting material. Also threaded into the annular extension 13 is an insulating outer sleeve 18 that may be formed of a phenolic condensation product. At its lower end it is threaded into an annular extension 19 which extends laterally from a metallic housing 20. Surrounding the insulating outer sleeve 18 is a tubular porcelain insulator 21 having compressible gaskets 22—22 at its ends to facilitate mounting thereof between the contact plate 11 and the metallic housing 20.

The circuit is arranged to be made and broken through the circuit interrupter 10 by a movable contact 25 which has an annular contact surface 26 that is arranged, in the switch closed position shown in the drawing, to have surface contact engagement with the internal annular contact surface 16 on the stationary contact 15. The movable contact 25 is carried by a contact rod 27 which extends through the concentrically arranged insulating outer sleeve 18 and tubular porcelain insulator 21 into the metallic housing 20 where it is pivotally connected at 28 to one end of a link 29. The link 29 forms a part of an operating mechanism 30 which is located within the metallic housing 20. At its other end the link 29 is pivotally connected at 31 to a link 32 which is pivotally mounted at 33 on the metallic housing 20. The link 32 has a stop 34 that is arranged to engage an inner surface portion of the metallic housing 20 for limiting the movement of the contact rod 27 and movable contact 25 to the position shown in the drawing. This arrangement also limits the movement of the contact rod 27 and movable contact 25 in the open position since the operating mechanism 30 is of the toggle acting type. Pivoted at 35 intermediate the ends of the link 29 is one end of an arm 36 the other end of which is mounted for rotation with a rock shaft 37 that is journaled on opposite sides of the metallic housing 20. As described in the Baker patent provision is made for rotating the rock shaft 37 in one direction or the other for the purpose of moving the movable contact 25 from and to the closed position. For this purpose triggers are provided at opposite ends of the rock shaft 37. One of the triggers is illustrated by broken lines at 38. A toggle spring 39 is strained between the rock shaft 37 and the pivot connection 31 for the purpose of biasing the contact rod 27 and movable contact 25 to the closed or open position depending upon the position of the operating mechanism 30.

Movable with the movable contact 25 and contact rod 27 is a trailer 40 that is formed of methylmethacrylate resin. The trailer 40, together with the movable contact 25, is arranged to move into a liner in the form of an inner sleeve 41 that is located inside of the insulating outer sleeve 18. The inner sleeve 41 is positioned between the arcing ring 17 and a spacer 42 in the form of a compressible gasket that bears against the outer side of the metallic housing 20. The diameter of the outer surface 43 of the trailer 40 is slightly less than the diameter of the annular contact surface 26 on the movable contact 25. This provides the necessary mechanical clearance between the inner annular contact surface 16 and the outer surface 43 of the trailer 40 when the latter is moved therethrough. The diameter of the inner surface 44 of the inner sleeve 41 is substantially the same as the diameter of the internal annular contact surface 16. When the movable contact 25 is moved into the inner sleeve 41 and past the arcing ring 17 with current flowing therethrough, an arc is drawn therebetween. The arc thus drawn is extended over the inner surface 44 of the inner sleeve 41 and, as the trailer 40 moves into the inner sleeve 41, the arc is confined further by the outer surface 43.

Instead of forming the inner sleeve 41 of a stack of fiber washers as described in the Lindell and Baker patents, the inner sleeve 41 is formed of a tubular body of polypropylene. This material, in conjunction with the trailer 40 formed of methylmethacrylate resin, provides an arc confining and extinguishing structure having surfaces that are impinged upon by the arc that are formed on the one hand by the polypropylene and on the other hand by methylmethacrylate resin. Substantially improved results are obtained using this combination of materials over those obtained using the methylmethacrylate resin-fiber washer combination. Still further improvement is obtained when both the trailer 40 and the inner sleeve 41 are formed of polypropylene.

Polypropylene is a thermoplastic material. It has a lower density than most all other commercially available thermoplastics. When this polymer is polymerized, the propylene monomers attach themselves to each other in a specific oriented manner:

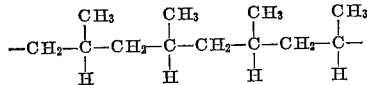

From the above formula, it can be seen that this particular polymer is a stero-specific polymer; that is, there is a specific relationship and arrangement of the groups in this polymer. This highly crystalline polymer, due to this property, is extremely strong and has a high melting point. The crystallinity, long chain, non-polar characteristics help impart good electrical properties. This material has been tested in an arc extinguishing test device and has been found to be better than the methylmethacrylate-fiber combination. Using polypropylene for the inner sleeve 41 and the trailer 40 and also using polypropylene for the inner sleeve 41, and methylmethacrylate for the trailer 40, definite advantages were found over the methylmethacrylate-fiber washer combination.

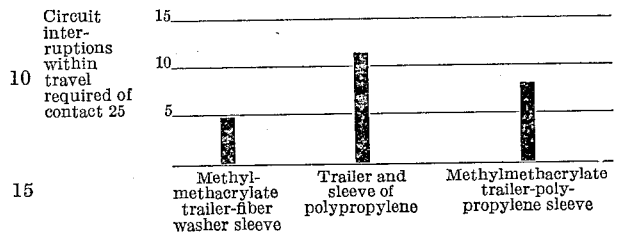

From the above graph showing circuit interruptions under identical operating conditions it can be seen that, using a trailer 40 and sleeve 41 both formed of polypropylene, the number of circuit interruptions was more than doubled over those obtained with the methylmethacrylate-fiber washer combination. When the methylmethacrylate-polypropylene combination was used, there was an increase of over 50% in the number of circuit interruptions over the methylmethacrylate-fiber washer combination.

The above formula represents only a portion of the polymeric formula for polypropylene. It shows a definite arrangement in the molecule.

Polypropylene is composed of many propylene units attached to each other in a definite manner as shown above.

What is claimed as new is:

1. In a circuit interrupter, in combination, a sleeve of polypropylene, a stationary contact at one end of said sleeve having an internal annular contact surface in alignment with the inner surface of said sleeve, a movable contact having an annular contact surface mounted for movement through said sleeve and into and out of engagement with said annular contact surface of said stationary contact, and a trailer secured to and movable with said movable contact through said stationary contact into said sleeve to confine an arc from said contacts between the inner surface of said sleeve and the outer surface of said trailer, said trailer substantially filling said sleeve and the material forming its outer surface and subjected to the heat of the arc evolving an arc extinguishing medium due to the arc heat.

2. The invention, as set forth in claim 1, wherein the material forming the surface of the trailer is methylmethacrylate.

3. The invention, as set forth in claim 1, wherein the material forming the surface of the trailer is polypropylene.

References Cited by the Examiner

UNITED STATES PATENTS 2,591,950  4/1952  Lindell _____ 200—149

FOREIGN PATENTS 221,103  4/1959  Australia.
223,198  7/1959  Australia.

KATHLEEN H. CLAFFY, *Primary Examiner.*

ROBERT K. SCHAEFER, BERNARD A. GILHEANY, *Examiners.*

P. E. CRAWFORD, *Assistant Examiner.*